US010423722B2

(12) United States Patent
Gardner

(10) Patent No.: US 10,423,722 B2

(45) Date of Patent: Sep. 24, 2019

(54) COMMUNICATION INDICATOR

(71) Applicant: AT&T INTELLECTUAL PROPERTY I, L.P., Atlanta, GA (US)

(72) Inventor: Christina Gardner, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 304 days.

(21) Appl. No.: 15/240,597

(22) Filed: Aug. 18, 2016

(65) Prior Publication Data

US 2018/0054398 A1 Feb. 22, 2018

(51) Int. Cl.
*G06F 15/16* (2006.01)
*G06F 17/27* (2006.01)
(Continued)

(52) U.S. Cl.
CPC .......... *G06F 17/271* (2013.01); *G06F 17/274* (2013.01); *G06F 17/2775* (2013.01);
(Continued)

(58) Field of Classification Search
CPC ............................... G06F 17/271; H04L 51/16
See application file for complete search history.

(56) References Cited

U.S. PATENT DOCUMENTS 5,630,150 A 5/1997 Kira
6,446,115 B2 * 9/2002 Powers ................ G06Q 10/107 358/402

(Continued)

FOREIGN PATENT DOCUMENTS

KR 20100125994 12/2010
WO 2006047347 A1 5/2006
WO 2009143108 A1 11/2009

OTHER PUBLICATIONS

Jaffe, Eric , "Why It's So Hard to Detect Emotion in Emails and Texts", http://www.fastcodesign.com/3036748/evidence/why-its-so-hard-to-detect-emotion-in-emails-and-texts, Discusses the use of emoticons to avoid email misinterpretation., 2014.

(Continued)

*Primary Examiner* — Hua Fan
(74) *Attorney, Agent, or Firm* — Guntin & Gust, PLC; Atanu Das

(57) ABSTRACT

Aspects of the subject disclosure may include, for example, method that includes receiving a communication from equipment of a first user directed towards a second user, analyzing a first communication style of the communication from the equipment of the first user, determining a second communication style of the second user, determining whether the first communication style matches the second communication style, providing a recommendation to the equipment of the first user to rewrite the communication according to the second communication style responsive to the determining the first communication style does not match the second communication style, and providing the communication to equipment of the second user responsive to the determining that the first communication style matches the second communication style. Other embodiments are disclosed.

18 Claims, 12 Drawing Sheets

(51) Int. Cl.
*H04L 12/58* (2006.01)
*H04L 29/08* (2006.01)

(52) U.S. Cl.
CPC .............. *H04L 51/02* (2013.01); *H04L 51/16* (2013.01); *H04L 67/1097* (2013.01)

(56) References Cited

U.S. PATENT DOCUMENTS

| | | | |
|---|---|---|---|
| 7,921,369 B2 * | 4/2011 | Bill ................... | G06F 17/30749 709/206 |
| 7,983,910 B2 | 7/2011 | Subramanian et al. | |
| 8,056,005 B2 | 11/2011 | Giannetti et al. | |
| 8,065,267 B2 | 11/2011 | Noda et al. | |
| 8,166,126 B2 | 4/2012 | Bristow et al. | |
| 8,171,084 B2 | 5/2012 | Walter et al. | |
| 8,184,318 B2 | 5/2012 | Henry et al. | |
| 8,413,055 B2 | 4/2013 | Yuen et al. | |
| 8,694,899 B2 | 4/2014 | Goossens et al. | |
| 8,782,536 B2 | 7/2014 | Tu et al. | |
| 2003/0154446 A1 | 8/2003 | Constant et al. | |
| 2005/0075880 A1 * | 4/2005 | Pickover ............ | G06F 17/2785 704/270 |
| 2008/0294741 A1 | 11/2008 | Dos Santos et al. | |
| 2009/0055484 A1 | 2/2009 | Vuong et al. | |
| 2013/0268881 A1 | 10/2013 | Bartkiewicz et al. | |
| 2015/0269125 A1 | 9/2015 | Desai et al. | |

OTHER PUBLICATIONS

Mukherjee, Srijeet , "Emoticons: An Aim to Fulfil Prosodic Features in Text-Based Communication", http://www.academia.edu/download/34515504/Emoticons_Srijeet.pdf, Paper discloses that "the aim of the paper to find out whether the recipient interprets an emoticon in the same way as the sender had meant it to be interpreted or is there is any difference.", 2014.

Seiter, Courtney , "7 Reasons to Use Emoticons in Your Writing and Social Media, According to Science", https://blog.bufferapp.com/7-reasons-use-emoticons-writing-social-media-according-science, Discloses results of scientific studies showing the benefits of emoticons, even in business settings (section 3) and clarification of message meanings and tones., 2015.

Skovholt, Karianne , "The Communicative Functions of Emoticons in Workplace E-Mails: :-)*", http://onlinelibrary.wiley.com/store/10.1111/jcc4.12063/asset/jcc412063.pdf?v=1&t=ipo6gafs&s=c975b91e2b40b471f7eef587300dc42e7fe51b1f, Paper discloses that emoticons function as contextual clues about the writers emotions in a workplace environment., 2014.

Walther, Joseph , "The Impacts of Emoticons on Message Interpretation in Computer-Mediated Communication", http://hc.rediris.es/pub/bscw.cgi/d3323568/impactoemoticones.pdf, Discloses an experimental study of emoticon uses and message interpretation., 2001.

* cited by examiner

100

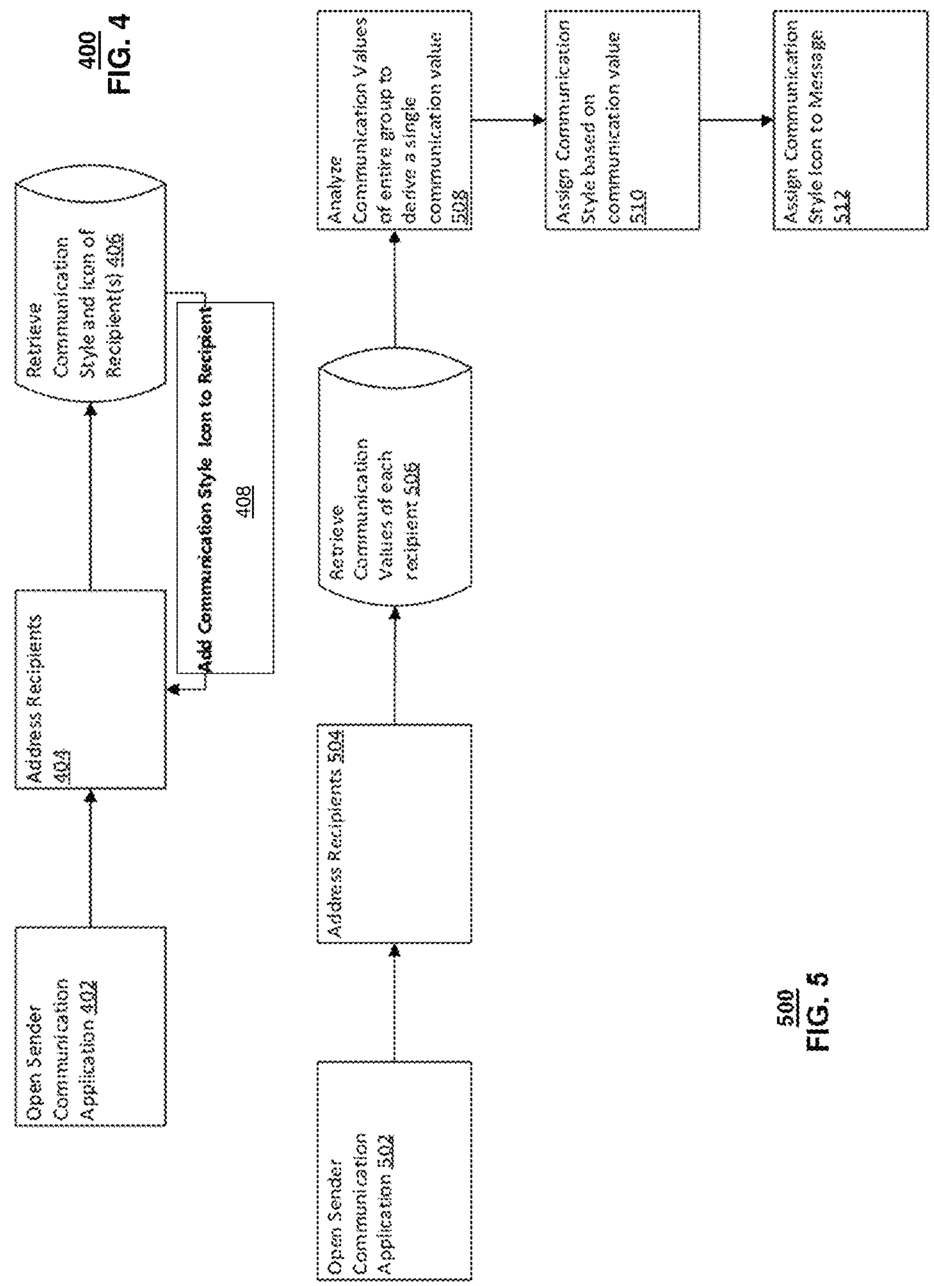

400
FIG. 4
Open Sender Communication Application 402
Address Recipients 404
Retrieve Communication Style and Icon of Recipient(s) 406
Add Communication Style Icon to Recipient
408
Open Sender Communication Application 502
Address Recipients 504
Retrieve Communication Values of each recipient 506
Analyze Communication Values of entire group to derive a single communication value 508
Assign Communication Style based on communication value 510
Assign Communication Style Icon to Message 512
500
FIG. 5

600

800

700

900

Indicates user's communication value falls in communication style overlap or compliments the styles of the group Indicates user's communication value opposes the other communication styles of the group

Figures 11, 12, 13:
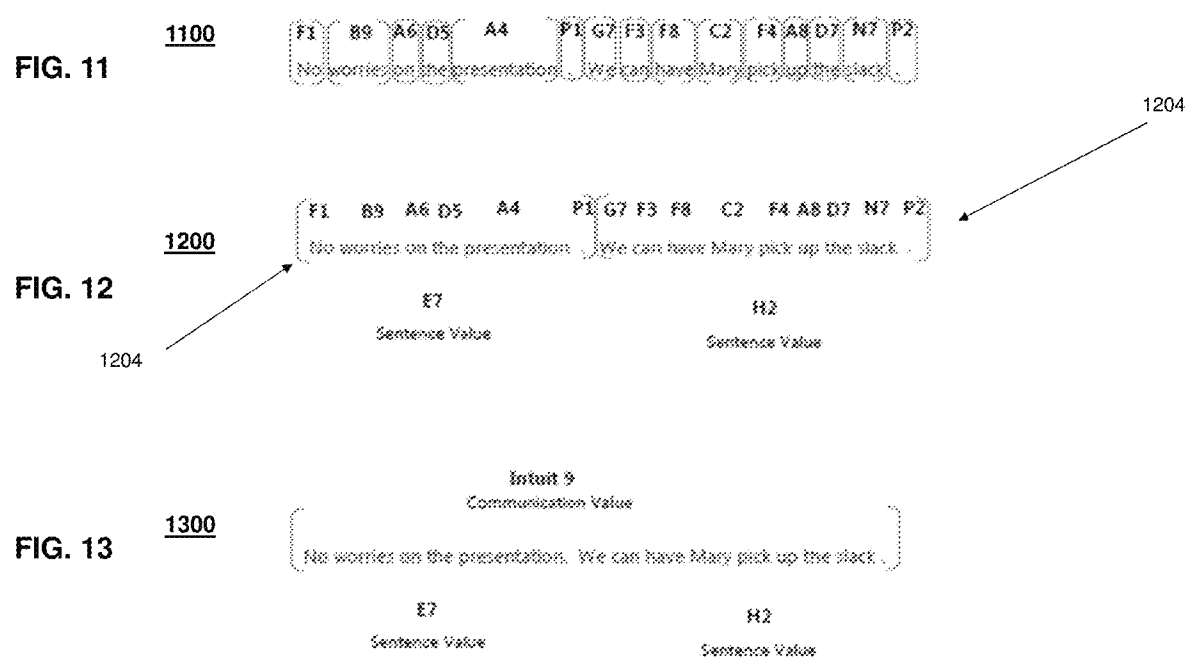

No worries on the presentation. We can have Mary pick up the slack.

No worries on the presentation. We can have Mary pick up the slack.

E7
Sentence Value

H2
Sentence Value

Intuit 9
Communication Value

No worries on the presentation. We can have Mary pick up the slack.

E7
Sentence Value

H2
Sentence Value

1400

1500

1600

1700

1800

COMMUNICATION INDICATOR

FIELD OF THE DISCLOSURE

The subject disclosure relates to a system that identifies a communication context.

BACKGROUND

Interpersonal communication frequently takes place among electronic devices without any indication of the tone and emotional context of the participants.

BRIEF DESCRIPTION OF THE DRAWINGS

Reference will now be made to the accompanying drawings, which are not necessarily drawn to scale, and wherein:

FIG. 4 depicts an illustrative embodiment of a method 400;

FIG. 5 depicts an illustrative embodiment of a method 500;

FIG. 11 depicts an illustrative example of a sentence analysis 1100;

FIG. 12 depicts an illustrative example of a sentence analysis 1200;

FIG. 13 depicts an illustrative example of a sentence analysis 1300;

DETAILED DESCRIPTION

Figure 1:
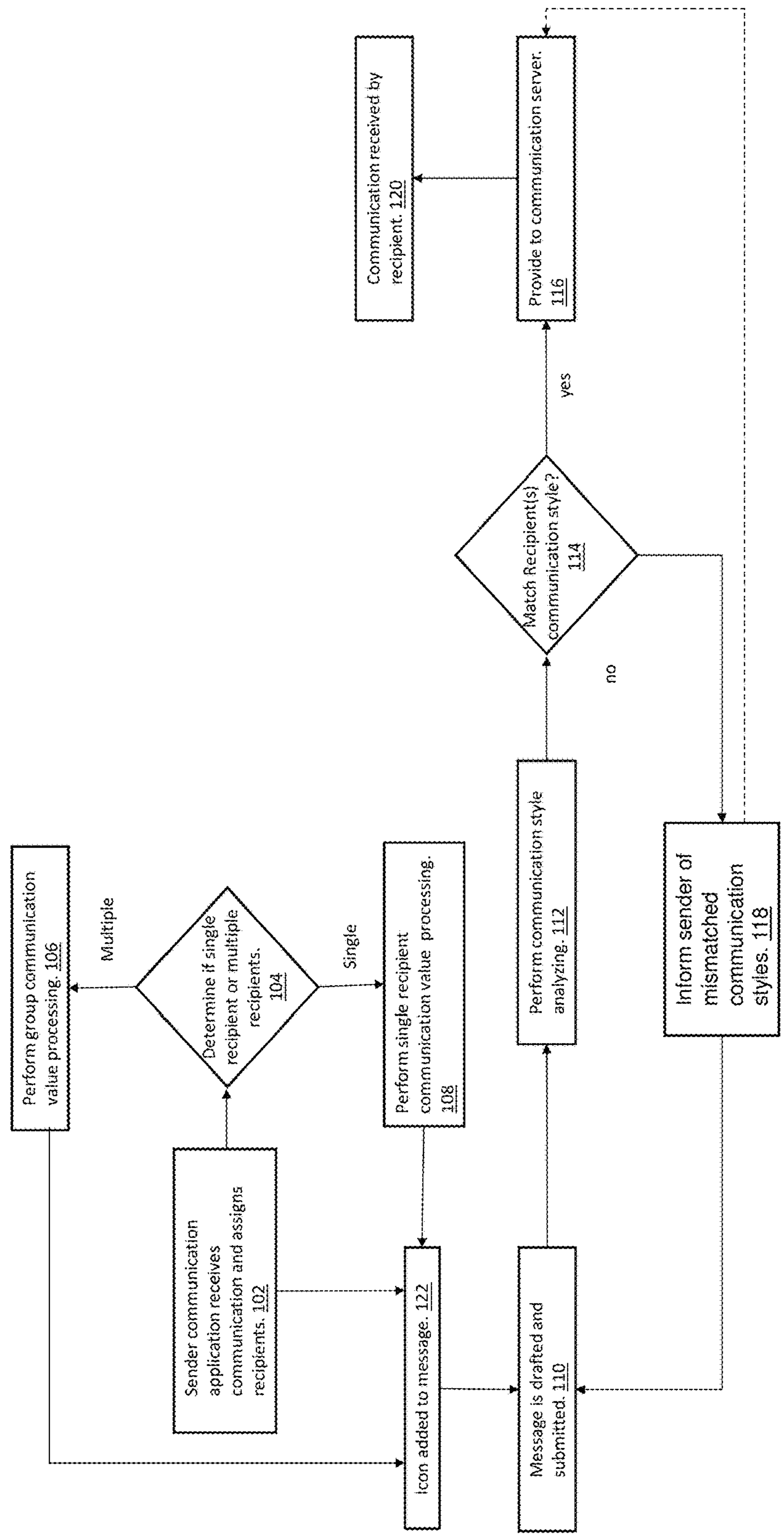
FIG. 1 depicts an illustrative embodiment of a method 100.

The subject disclosure describes, among other things, illustrative embodiments for providing consistent communication style in communications. Other embodiments are described in the subject disclosure.

One or more aspects of the subject disclosure include a method that includes receiving, by a processing system comprising a processor, a communication from equipment of a first user directed towards a second user, analyzing, by the processing system, a first communication style of the communication from the equipment of the first user, determining, by the processing system, a second communication style of the second user, determining, by the processing system, whether the first communication style matches the second communication style, providing, by the processing system, a recommendation to the equipment of the first user to rewrite the communication according to the second communication style responsive to the determining the first communication style does not match the second communication style, and providing, by the processing system, the communication to equipment of the second user responsive to the determining that the first communication style matches the second communication style.

One or more aspects of the subject disclosure include apparatus that includes a processing system including a processor and a memory that stores executable instructions that, when executed by the processing system, facilitate performance of operations that include receiving an input comprising an outgoing communication message, determining a recipient of the outgoing communication message, determining a communication value of the recipient, determining a communication style of the outgoing communication message, determining if the communication style of the outgoing communication message correlates to the communication value of the recipient, providing the outgoing communication message to a communication server response to determining that the communication style of the outgoing communication message matches the communication value of the recipient, and generating feedback comprising a notification of a communication style mismatch responsive determining that the communication style of the outgoing communication message does not match the communication value of the recipient.

One or more aspects of the subject disclosure include a machine-readable storage medium associated with a processing system that performs operations that include receiving an input comprising an communication message from a first communications device, wherein the communication message includes a message and a recipient of the communication message, determining a communication value of the recipient, determining a communication style of the communication message, determining if the communication style of the communication message matches the communication value of the recipient, providing the communication message to a second communication of the recipient responsive to the communication style of the communication message matching the communication value of the recipient, generating a notification of a communication style mismatch responsive determining that the communication style of the communication message does not match the communication value of the recipient, and providing the notification to the first communication device.

FIG. 1 depicts an illustrative embodiment of a method 100 that can be employed in a computing system or processing system to provide a communication assessment and a communication recommendation to interpersonal communications over various forms of communication. For example, method 100 can be employed at a communications device, a personal computer, or a server connecting various communications devices and computing devices that share communications. The various communications can be performed by communication applications including emails, instant messages, calendar appointments, meeting notifications, and social media communications.

FIG. 1 exemplarily begins at a point in which a communication application receives a communication from a user in Step 102. The communication may include a message, an addressee, a subject line, and images. Referring to FIG. 4, method 400 can exemplarily find a communication style of a recipient of the sender's outgoing communication. In Step 402, an exemplary communication application according to the present disclosure can be initiated, if it is not already operating, upon receiving an input of who the recipient or recipients are to be. In Step 404, an address book containing information about the recipients is exemplarily opened. In Step 406, the recipient's communication style along with a communication icon, as discussed below, can be retrieved.

Referring back to FIG. 1, method 100 then proceeds to Step 104, the communication is analyzed to determine a number of recipients of the communication. In some embodiments, an addressee field is analyzed. If it is determined that the communication is intended for a single recipient, method 100 can proceed to Step 108 in which a communication value is determined for a single recipient. If it is determined that the communication is intended for multiple recipients, method 100 can proceed to Step 106 in which a group communication value is processed.

In Step 106, a group communication value is processed. One exemplary method of determining the group communication value is exemplarily illustrated in method 500 of FIG. 5. In FIG. 5, in Step 502, the communication application can be exemplarily initiated or opened. In Step 504, the addresses of the recipients can exemplarily be retrieved. Next, in Step 506, a communication value for each of the recipients can be retrieved. These communication values can be stored locally or remotely, such as in the cloud or with a communication server.

Figure 10:
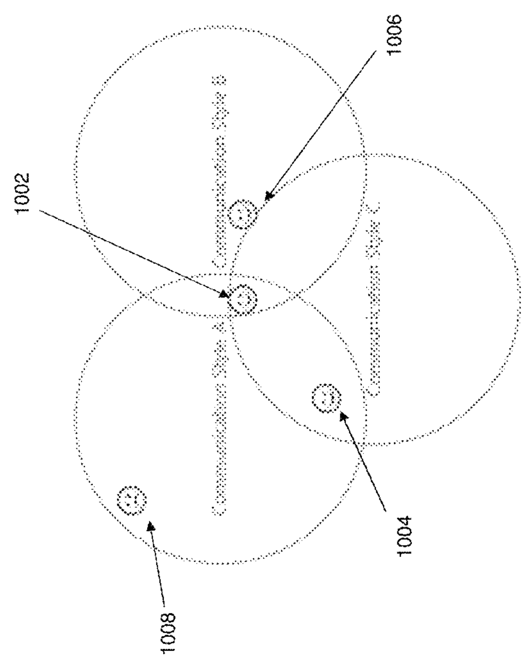
FIG. 10 depicts an illustration of various overlapping group communication styles 1000.

In Step 508 the communication values for the entire group is analyzed to determine a single group communication value. FIG. 10 illustrates an exemplary example 1000 in which three communications styles of a group communication are analyzed. Referring to FIG. 10, a hypothetical three party communication is analyzed. Exemplarily, Communication Style A, Communication Style B, and Communication Style C each have various portions that overlap or compliment other systems as well as the style of the group. In addition, each of Communications A, B, and C have various communication values that opposes the other members. The opposing and complimentary styles are symbolized by the sad face and happy face, respectively. In example 1000, a communication style point 1002 is found that all three recipients concur upon while communication style point 1004 is found that Communication Style A and C concur upon. Communication style point 1006 illustrates an example in which a style that almost concurs between Communication Style B and C. In this instance, style point 1006 may be a fallback position, a tie-breaker or ignored. Finally, style point 1008 is one that opposes the other Communication Styles and shouldn't be used.

Referring back to FIG. 5, once a single communication value for the group communication is determined in Step 510, a communication style is exemplarily assigned to the communication based on the single communication value. Exemplarily, a closely matching communication style is chosen. In some examples, no exactly matching communication style is available and a second best or alternative style is chosen, such as a communication style that would embody the style points 1004 and 1006 in FIG. 10 while style point 1008 would be avoided.

Additionally, a communication style icon can be assigned to the communication in Step 512. In different examples, the style icon can be ornate or simple. The style icon can indicate the preferred closely matching communication style for the group's communication.

Figure 7:
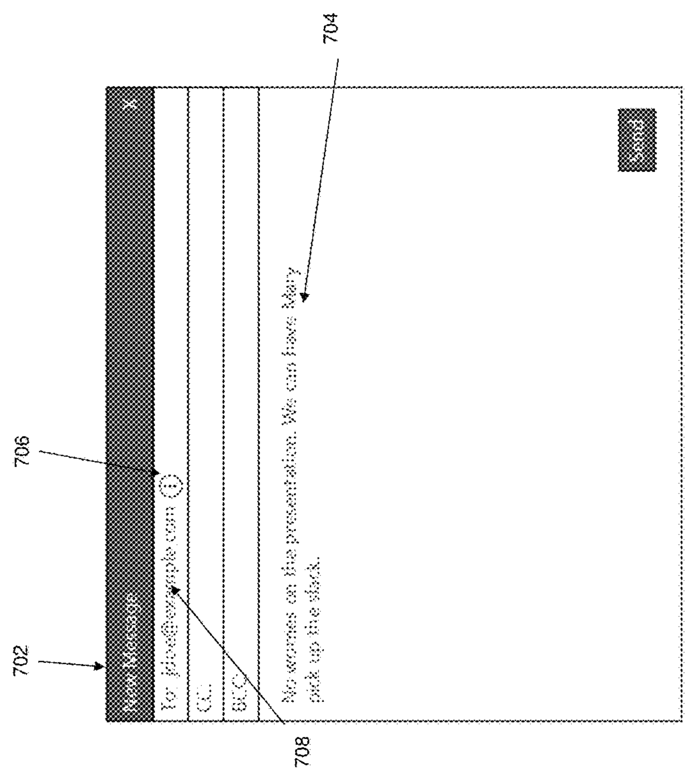
FIG. 7 depicts an illustrative embodiment of an exemplary communication 700.

Referring to FIG. 7, an exemplary communication message 702, in this example an email, is illustrated in which icon 706 is exemplarily included. Icon 706 has been exemplarily inserted into the email 702. Recipients in the user's address book/contact list have a communication style icon. The purpose of the icon 706 is to let the user know what style to draft the communication in. Exemplarily, these icons are assigned and updated by an application running on a cloud server.

Returning to FIG. 1, once Step 106 is completed, method 100 exemplarily proceeds to Step 122. If on the other hand in Step 104 it is determined that the message is only intended for a single recipient, method 100 exemplarily would proceed to Step 108. In Step 108, a single recipient communication value is exemplarily determined.

In Step 122, an icon or icons that were retrieved in one of Steps 106 or 108 can be added to the message. Next, in Step 110, the rest of the outgoing communication can be drafted and submitted for delivery. Exemplarily, while the sender drafts the message, the icon is visible to remind the sender of the recipient's communication style. Exemplarily, Steps 106 and 108 would occur before the outgoing communication is completed in Step 110 because the system could exemplary make these determinations as soon as the recipients are identified. In other embodiments, the recipient is recognized and Step 102 may proceed directly to Step 122 without performing the analysis steps of either one of Steps 106 or 108. Accordingly, it is likely that if the sender enters the recipient's names first, the processing steps could be completed before the entire outgoing communication is drafted. In addition, Step 110 could allow for re-editing the outgoing communication as described below.

Figures 2, 3:
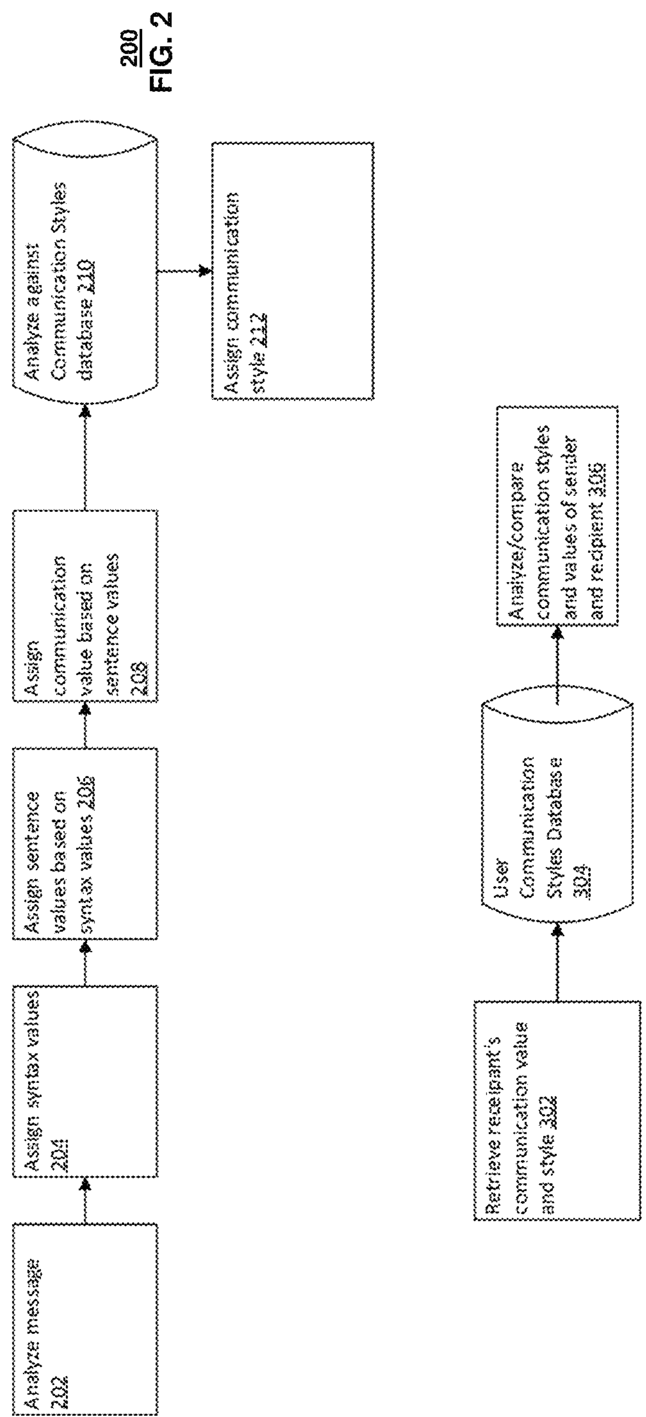
FIG. 2 depicts an illustrative embodiment of a method 200.
FIG. 3 depicts an illustrative embodiment of a method 300.

Next, in Step 112, an analysis of the sender's communication style can be performed. Referring to FIG. 2, the analysis of the sender's communication style as contained in the outgoing communication can be determined in method 200. In Step 202, the analysis of the method can begin. Next, in Step 204, words, punctuation, and symbols of the outgoing communication are assigned syntax values.

Referring to FIG. 11, outgoing message 1100 is exemplarily analyzed for syntax values as referred to in Step 204 of FIG. 2. Exemplarily, as illustrated in FIG. 11, a portion of the outgoing communication which may include a sentence, paragraph, phrase, or other portion of the outgoing message is analyzed.

Syntax values can be assigned based on criteria that can include one or more of the following: all grammatical components, word placement, word repetition, word definition, word type (slang/formal English), symbol placement, symbol repetition, punctuation placement, punctuation repetition, and/or visual formatting. For example, in FIG. 11, the word "the" is used twice and given different values (i.e., "D5" and "D7"). As illustrated in FIG. 11, each of the words have different values assigned thereto.

Returning to FIG. 2, in Step 206, a sentence of the communication is exemplarily assigned a sentence value based the syntax values. In some embodiments, a portion of the outgoing communication other than sentences can be analyzed to receive a value based on the syntax values for a unit of words that makes up the portion of the outgoing communication. In some embodiments, this portion could be a phrase or a paragraph. Exemplarily, each sentence of the communication can be assigned a sentence value.

Referring to FIG. 12, the outgoing communication 1200 is analyzed to obtain the sentence value. Outgoing message is divided into two sentences 1202 and 1204. Based on the assigned syntax values achieved in Step 204, sentences 1202 and 1204 are given their respective sentence values. Returning to FIG. 2, in Step 208, a communication value is exemplarily assigned to the outgoing communication based on the sentence values of the sentences contained within and missing components such as greeting, closing, and signature from the outgoing message.

Referring to FIG. 13, outgoing message 1300 is assigned a communication value based on the sentence values. Accordingly, in some embodiments FIGS. 11-13 illustrate that the deriving of the communication value exemplarily includes performing a syntax analysis on the communication to determine a syntax value for each word, symbol, and punctuation of the communication from the equipment of the first user. Next, a sentence analysis is exemplarily preformed on identified sentences of the communication based on a syntax value of each word in the sentence to determine sentence values for each of the identified sentences. Exemplarily, a communication value is generated based on the sentence values for the communication.

Thus, in this example, a combination of sentence scores E7 and H2 provide a communication value of "Intuit 9". In additional embodiments, the analysis can use other score methodology to assess the communication value, sentence value, and syntax value. Returning to FIG. 2, in Step 210, a communication styles database is accessed to find a communication style that matches the communication value. Thus, for example, in the current example, the database would be searched for style that match the "Intuit 9" communication value.

In Step 212, the resulting communication style that is retrieved from the database would be exemplarily assigned to the outgoing communication. Thus, in this example, returning to FIG. 1, Step 112 would return a communication value of "Intuit 9" for the sender's outgoing communication. In additional embodiments, the exemplarily analysis in FIGS. 11-13 can be performed for additional analysis of other communications so as exemplarily generate a communication value for any communication received or sent by the user.

Exemplarily, each of the syntax values, sentence values, communication values, and communication styles can be generated based on communication and/or psychological variables. The communication and/or psychological variables can be arranged, ordered, or scored so as to best match differing or common communication styles. The communication styles database can exemplarily include these values for different style of communicating.

Next, in Step 114, the outgoing communication's communication value is compared to the recipient's communication style. Referring to FIG. 3, method 300 exemplarily determines the match between the recipient's communication value and style and the sender's outgoing communication's communication value and style. In Step 302, the sender's outgoing communication's communication value and style is retrieved. In Step 304 of method 300, a database of recipient communications styles can be accessed. Based on an analysis and comparison of the recipient to the database, the communications values and styles of the sender and recipient can be determined in Step 306. Exemplarily, the match could be perfect, acceptable, less than acceptable, unacceptable, or some other comparison outcome.

Depending on the communication value and style and the recipient's communication value and style or recipients' group communication value and style, the fit can be determined and if a threshold is not met, then method 100 can proceed to Step 118 where the sender is informed that there is a mismatch between the outgoing communication's communication style and the recipient's or recipients' communication style. In some embodiments, the sender can be provided with hints on how to improve the communication according to the preferred communication style. The sender could then override the system or rewrite the message to better match the preferred communication style.

Thus, Step 118 could proceed to Step 110 where the outgoing communication is edited or a new outgoing communication message is provided by the sender. In some embodiments, the sender can elect to ignore Step 118 and proceed directly to sending the outgoing communication to the communication server in Step 118.

If, on the other hand, the outgoing communication message matches the recipient's preference, method 100 can proceed to Step 116 in which the outgoing message is provided to the appropriate communication server for delivery to the recipient or recipients. Next, in Step 120, the communication would exemplarily be received by the intended recipient or recipients.

Referring to FIG. 7, screen shot 700 describes an exemplary email 702 is illustrated. In this example, email 702 includes a message 704. In addition, the email 702 includes icon 706 which identifies the communication style of the recipient 708.

Figure 8:
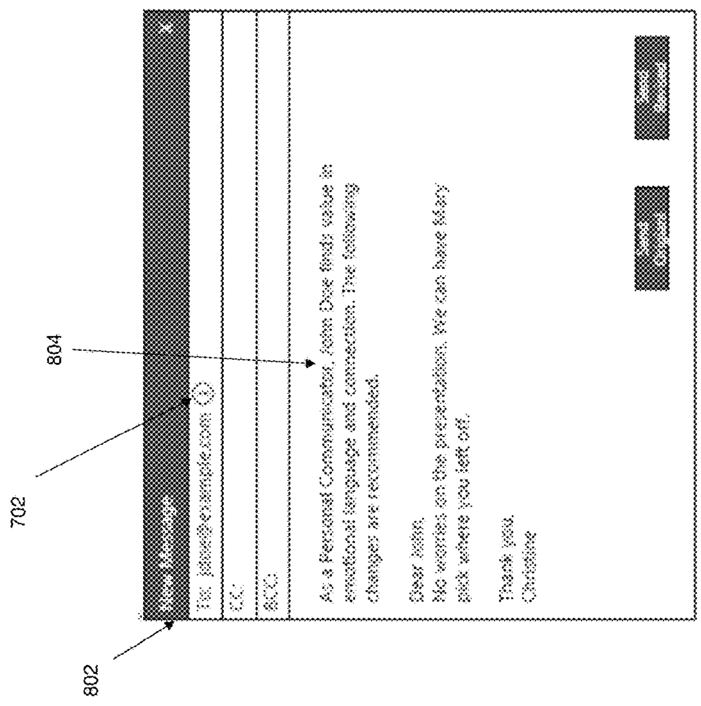
FIG. 8 depicts an illustrative embodiment of an exemplary communication 800.

Referring to FIG. 8, screen shot 800 describes an exemplary modified email 802 that has been provided with suggestions that may be provided in accordance with Step 118 of FIG. 1. Exemplarily, message 802 can identify the recipient's preferred communication style as indicated with icon 702. In addition, message 802 can also include suggested additions or other edits to the communication consistent with that communication style in the message portion 804.

Figure 9:
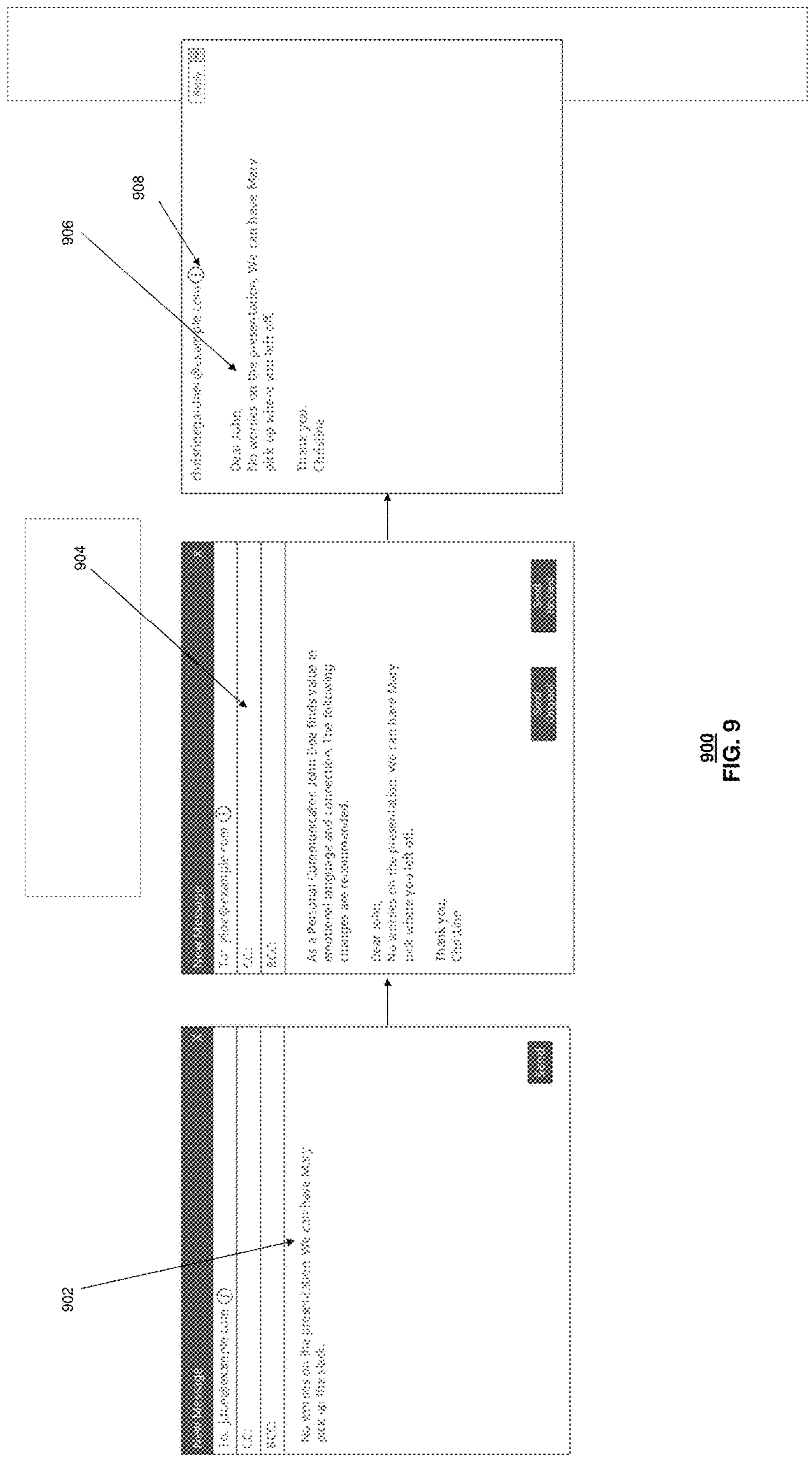
FIG. 9 depicts an illustrative embodiment of an exemplary communication 900

Referring to FIG. 9, various exemplary stages of an outgoing email 902 being sent according to exemplary embodiments of method 100 of FIG. 1. Email 902 with a message is entered by a user with a recipient. Next, screenshot 904 illustrates a modified message similar to that of FIG. 8. In addition, screenshot 904 illustrates that the user can be presented with the option to send the original message or to accept the change and send the modified message. Next, message 908 illustrates a completed communication where the recipient has received message 908 on his own device. In addition, the sender's own style icon can be provided for the user.

Figure 6:
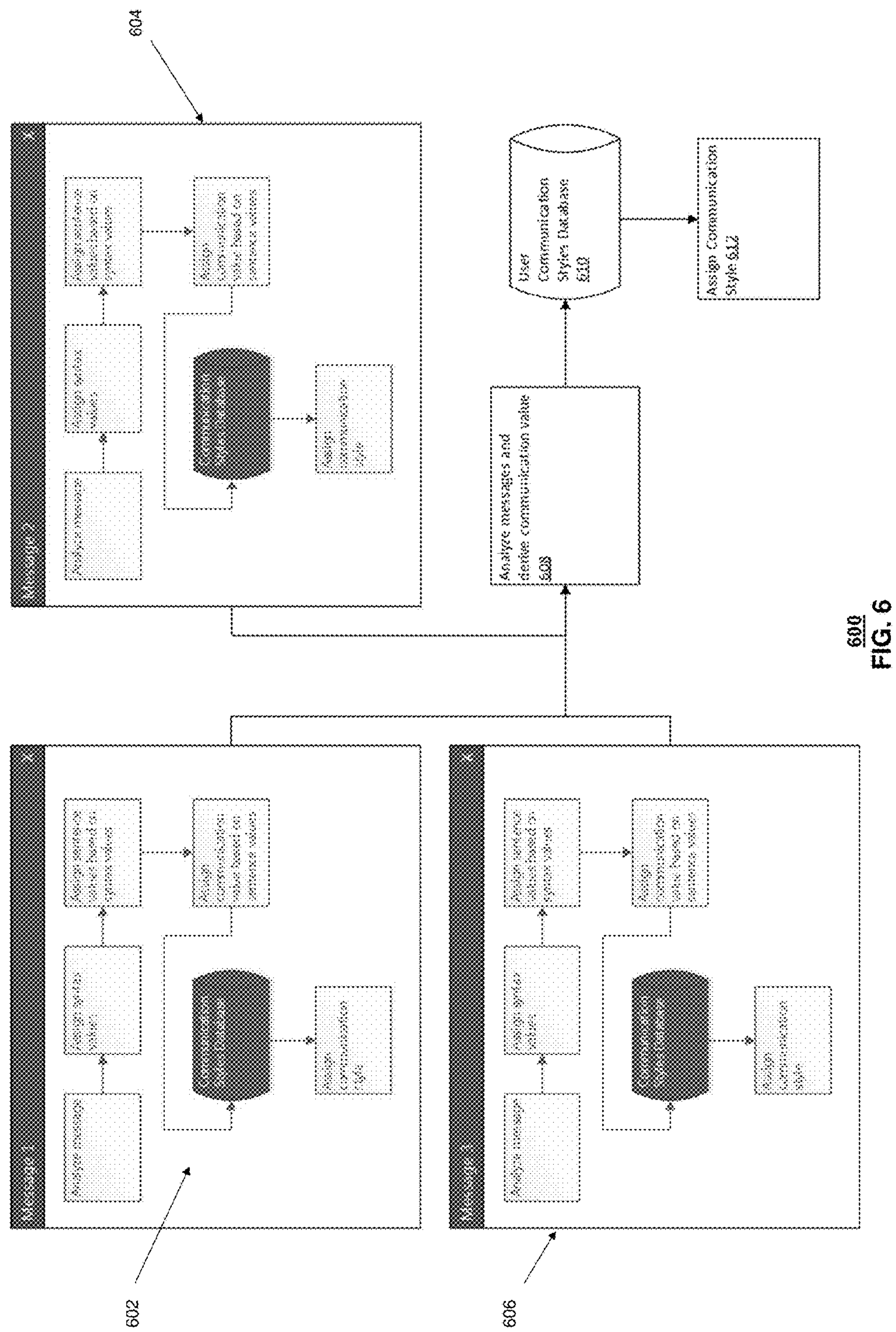
FIG. 6 depicts an illustrative embodiment of a method 600.

FIG. 6 describes a method 600 in which a user's messages can exemplarily be monitored over a period of time to develop a communication style database for that user. In additional embodiments, style databases for other users can be developed by similarly monitoring their incoming messages. As exemplarily illustrated in FIG. 6, multiple messages 602, 604, and 606 are exemplarily received by method 600 and processed as exemplarily illustrated in method 100 of FIG. 1. As the messages 602, 604, and 606 are processed to ultimately be delivered to their respective recipients, method 600 can perform Step 608 in which the messages are analyzed so that their respective communication values are determined.

Next, in Step 610 a user communication style database is accessed. Exemplarily, the user's profile can be updated with the communication value of the message to thereby update the database in Step 612. In additional embodiments, Steps 608 and 610 can be performed for incoming messages and their resulting communication values stored for the senders of those messages. Exemplarily, over time, a user's database can updated with communication values for the users and the user's contacts. In additional embodiments, method 600 can be implemented by a recipient device, any other person performing software function of the communication application, or by a communication server that transmits the communications between users.

Figure 18:
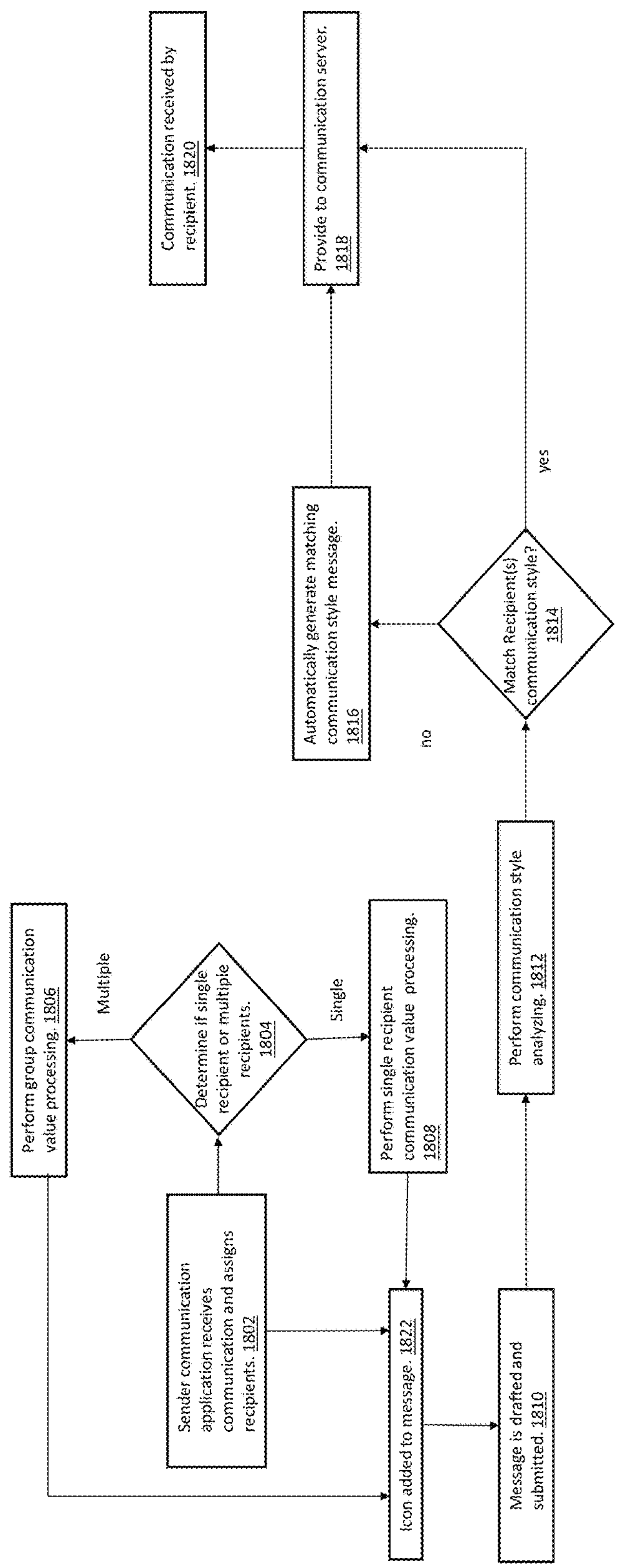
FIG. 18 depicts an illustrative embodiment of a method 1800.

Referring to FIG. 18, method 1800 provides another exemplary embodiment in which the messages are automatically analyzed, edited, and sent to the recipients. Similar to FIG. 1, in Step 1802, a message is initiated and then the recipients are analyzed in Step 1804 and then analyzed or retrieved in Steps 1808 and/or 1806 to add icons to recognized recipients in an address bar or other portion of the message in Step 1822. In Step 1810, the system awaits completion of the message by the sender. Similar to FIG. 1, the icon is available to remind the sender of the preferred communication style and value of the recipient. Once completed, method 1800 proceeds to Step 1812 in which the message is analyzed and then to Step 1814 in which the communication value and style of the message is compared to the communication value and style of the recipient.

If, in Step 1814, the communication value and style of the message matches the communication value and style of the recipient, the message is exemplarily provided to the communication server for delivery in Step 1818 to be received by the recipient in Step 1820. If, in Step 1814, the communication value and style of the message does not match the communication value and style of the recipient, the message is exemplarily edited by the system in Step. 1816. In Step 1814, the match between the communication value and style of the message and the communication value and style of the recipient can be based on a certain threshold matching requirement. In other embodiments, a closely matching style can be considered acceptable.

In Step 1816, the message can be edited by the system to match the preferred communication value and style of the recipient. Exemplarily, the editing can completely match the preferred communication value and style of the recipient. In other embodiments, the system may be able to match a portion of the preferred communication value and style of the recipient in the editing of the message. Thus, for example, messages 702 and 802 of FIGS. 7 and 8 can be performed automatically. Returning to FIG. 18, the edited message is then provided to the communication server for delivery in Step 1818 to be received by the recipient in Step 1820.

While for purposes of simplicity of explanation, the respective processes are shown and described as a series of blocks in FIGS. 1-13 and 18, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 14:
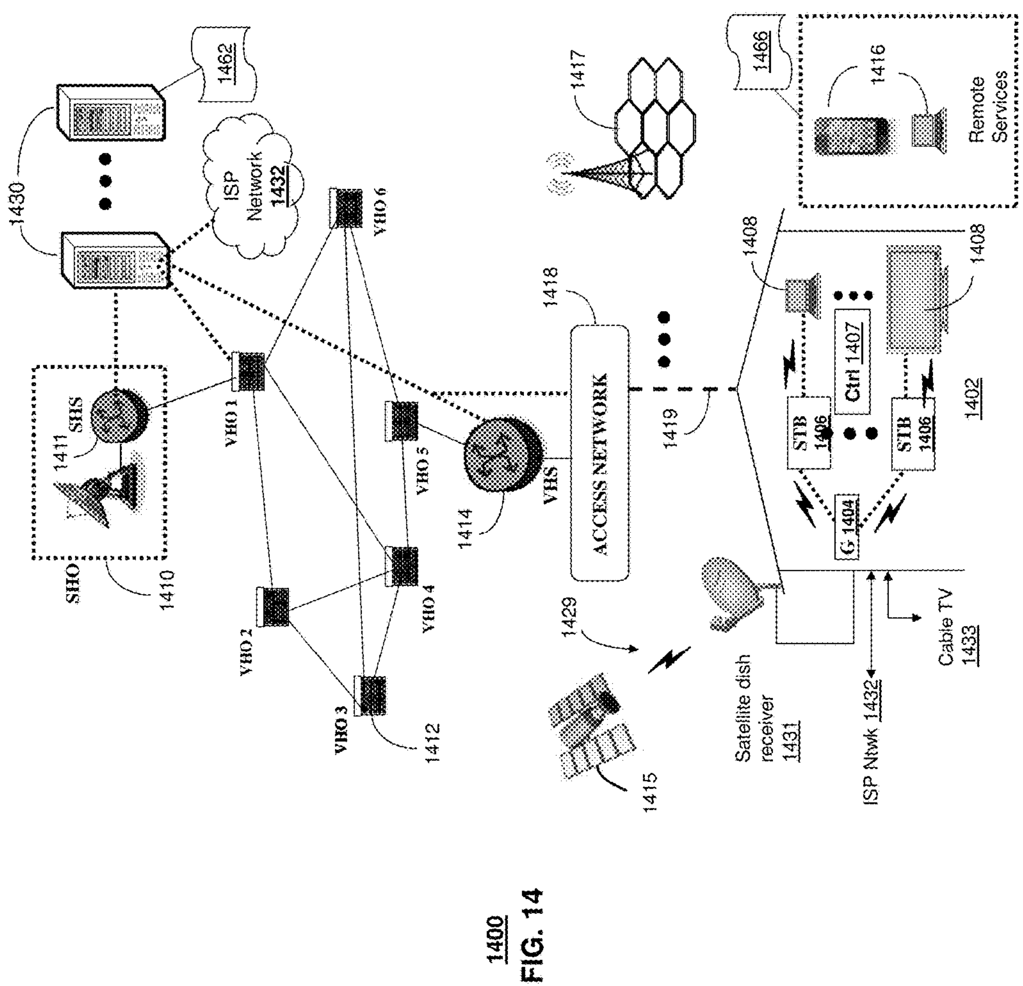
FIG. 14 depicts an illustrative embodiment of a communication system that provide media services to the various communications methods of FIGS. 1-6.

FIG. 14 depicts an illustrative embodiment of a first communication system 1400 for delivering media content. The communication system 1400 can represent an Internet Protocol Television (IPTV) media system. Communication system 1400 can be overlaid or operably coupled with a communication device or computing system that performs methods 100-600 as a representative embodiment of communication system 1400. For instance, one or more devices illustrated in the communication system 1400 of FIG. 14 can perform operations that include apparatus that includes determining a recipient of the outgoing communication message, determining a communication value and style of the recipient, determining a communication style of the outgoing communication message, determining if the communication style of the outgoing communication message matches the communication value and style of the recipient, providing the outgoing communication message to a communication server response to determining that the communication style of the outgoing communication message matches the communication value and style of the recipient, and generating feedback comprising a notification of a communication style mismatch responsive determining that the communication style of the outgoing communication message does not match the communication value and style of the recipient.

The IPTV media system can include a super head-end office (SHO) 1410 with at least one super headend office server (SHS) 1411 which receives media content from satellite and/or terrestrial communication systems. In the present context, media content can represent, for example, audio content, moving image content such as 2D or 3D videos, video games, virtual reality content, still image content, and combinations thereof. The SHS server 1411 can forward packets associated with the media content to one or more video head-end servers (VHS) 1414 via a network of video head-end offices (VHO) 1412 according to a multicast communication protocol.

The VHS 1414 can distribute multimedia broadcast content via an access network 1418 to commercial and/or residential buildings 1402 housing a gateway 1404 (such as a residential or commercial gateway). The access network 1418 can represent a group of digital subscriber line access multiplexers (DSLAMs) located in a central office or a service area interface that provide broadband services over fiber optical links or copper twisted pairs 1419 to buildings 1402. The gateway 1404 can use communication technology to distribute broadcast signals to media processors 1406 such as Set-Top Boxes (STBs) which in turn present broadcast channels to media devices 1408 such as computers or television sets managed in some instances by a media controller 1407 (such as an infrared or RF remote controller).

The gateway 1404, the media processors 1406, and media devices 1408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1406 and subsystems of the IPTV media system for services such as video-on-demand (VoD), browsing an electronic programming guide (EPG), or other infrastructure services.

A satellite broadcast television system 1429 can be used in the media system of FIG. 14. The satellite broadcast television system can be overlaid, operably coupled with, or replace the IPTV system as another representative embodiment of communication system 1400. In this embodiment, signals transmitted by a satellite 1415 that include media content can be received by a satellite dish receiver 1431 coupled to the building 1402. Modulated signals received by the satellite dish receiver 1431 can be transferred to the media processors 1406 for demodulating, decoding, encoding, and/or distributing broadcast channels to the media devices 1408. The media processors 1406 can be equipped with a broadband port to an Internet Service Provider (ISP) network 1432 to enable interactive services such as VoD and EPG as described above.

In yet another embodiment, an analog or digital cable broadcast distribution system such as cable TV system 1433 can be overlaid, operably coupled with, or replace the IPTV system and/or the satellite TV system as another representative embodiment of communication system 1400. In this embodiment, the cable TV system 1433 can also provide Internet, telephony, and interactive media services. System 1400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1430, a portion of which can operate as a web server for providing web portal services over the ISP network 1432 to wireline media devices 1408 or wireless communication devices 1416.

Communication system 1400 can also provide for all or a portion of the computing devices 1430 to function as a communications application (herein referred to as communications application 1430). The communications application 1430 can use computing and communication technology to perform function 1464, which can include among other things, the various steps towards matching communication styles between different users as described by method 100 of FIG. 1. For instance, communications application 1430 of server 1430 can be similar to the functions described for the communications style data base as described in method 600 of FIG. 6, for example. The wireless communication devices and computing devices 1416 can be provisioned with software function 1466, respectively, to utilize the services of communications application 1430. For instance, functions 1466 of wireless communication devices and computing devices 1416 can be similar to the functions described in any communications application that performs the functions of methods 100-600 of FIGS. 1-6, respectively.

Multiple forms of media services can be offered to media devices over landline technologies such as those described above. Additionally, media services can be offered to media devices by way of a wireless access base station 1417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 15:
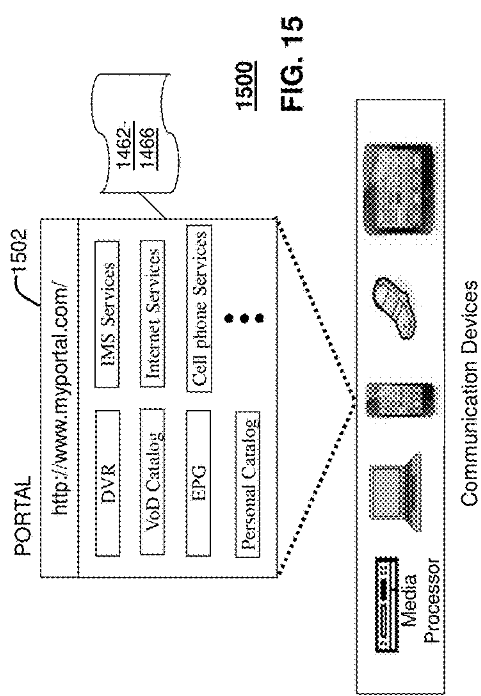
FIG. 15 depicts an illustrative embodiment of a web portal for interacting with the communication systems that can perform the various communications methods of FIGS. 1-6.

FIG. 15 depicts an illustrative embodiment of a web portal 1502 of a communication system 1500. Communication system 1500 can be overlaid or operably coupled with communication system 1400 as another representative embodiment of devices that can perform methods 100-600 of FIGS. 1-6, and/or communication system 1400. The web portal 1502 can be used for managing services of another representative embodiment of devices that can perform methods 100-600 of FIGS. 1-6, and/or communication system 1400. A web page of the web portal 1502 can be accessed by a Uniform Resource Locator (URL) with an Internet browser using an Internet-capable communication device such as those described in FIG. 4. The web portal 1502 can be configured, for example, to access a media processor 1406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1406. The web portal 1502 can also be used for provisioning IMS services described earlier, provisioning Internet services, provisioning cellular phone services, and so on.

The web portal 1502 can further be utilized to manage and provision software applications 1462 and 1466 to adapt these applications as may be desired by subscribers and/or service providers of representative embodiments of devices that can perform methods 100-600 of FIGS. 1-6, and/or communication system 1400. For instance, persons who access communication services provided by server 1430 can log into their on-line accounts and provision the servers 1430 with additional user, recipient, and/or sender communication style data, and so on. Service providers can log onto an administrator account to provision, monitor and/or maintain the server 1430.

Figure 16:
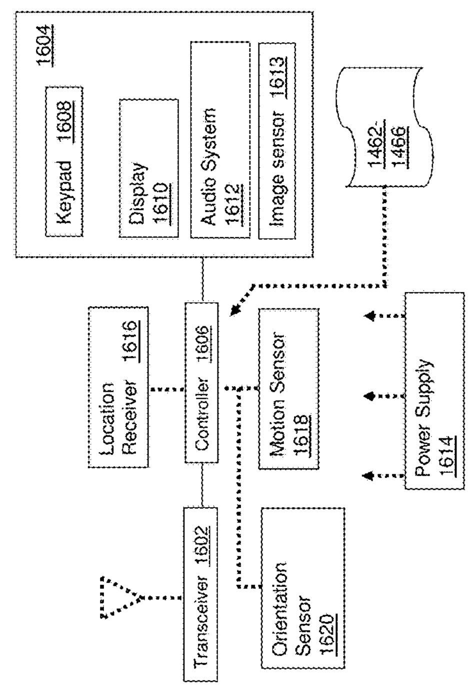
FIG. 16 depicts an illustrative embodiment of a communication device.

FIG. 16 depicts an illustrative embodiment of a communication device 1600. Communication device 1600 can serve in whole or in part as an illustrative embodiment of the devices depicted in representative embodiment of devices that can perform methods 100-600 of FIGS. 1-6, and/or communication system 1400.

Communication device 1600 can comprise a wireline and/or wireless transceiver 1602 (herein transceiver 1602), a user interface (UI) 1604, a power supply 1614, a location receiver 1616, a motion sensor 1618, an orientation sensor 1620, and a controller 1606 for managing operations thereof. The transceiver 1602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1602 can also be adapted to support circuit-switched wireline access technologies (such as PSTN), packet-switched wireline access technologies (such as TCP/IP, VoIP, etc.), and combinations thereof.

The UI 1604 can include a depressible or touch-sensitive keypad 1608 with a navigation mechanism such as a roller ball, a joystick, a mouse, or a navigation disk for manipulating operations of the communication device 1600. The keypad 1608 can be an integral part of a housing assembly of the communication device 1600 or an independent device operably coupled thereto by a tethered wireline interface (such as a USB cable) or a wireless interface supporting for example Bluetooth®. The keypad 1608 can represent a numeric keypad commonly used by phones, and/or a QWERTY keypad with alphanumeric keys. The UI 1604 can further include a display 1610 such as monochrome or color LCD (Liquid Crystal Display), OLED (Organic Light Emitting Diode) or other suitable display technology for conveying images to an end user of the communication device 1600. In an embodiment where the display 1610 is touch-sensitive, a portion or all of the keypad 1608 can be presented by way of the display 1610 with navigation features.

The display 1610 can use touch screen technology to also serve as a user interface for detecting user input. As a touch screen display, the communication device 1600 can be adapted to present a user interface with graphical user interface (GUI) elements that can be selected by a user with a touch of a finger. The touch screen display 1610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1610 can be an integral part of the housing assembly of the communication device 1600 or an independent device communicatively coupled thereto by a tethered wireline interface (such as a cable) or a wireless interface.

The UI 1604 can also include an audio system 1612 that utilizes audio technology for conveying low volume audio (such as audio heard in proximity of a human ear) and high volume audio (such as speakerphone for hands free operation). The audio system 1612 can further include a microphone for receiving audible signals of an end user. The audio system 1612 can also be used for voice recognition applications. The UI 1604 can further include an image sensor 1613 such as a charged coupled device (CCD) camera for capturing still or moving images.

The power supply 1614 can utilize common power management technologies such as replaceable and rechargeable batteries, supply regulation technologies, and/or charging system technologies for supplying energy to the components of the communication device 1600 to facilitate long-range or short-range portable applications. Alternatively, or in combination, the charging system can utilize external power sources such as DC power supplied over a physical interface such as a USB port or other suitable tethering technologies.

The location receiver 1616 can utilize location technology such as a global positioning system (GPS) receiver capable of assisted GPS for identifying a location of the communication device 1600 based on signals generated by a constellation of GPS satellites, which can be used for facilitating location services such as navigation. The motion sensor 1618 can utilize motion sensing technology such as an accelerometer, a gyroscope, or other suitable motion sensing technology to detect motion of the communication device 1600 in three-dimensional space. The orientation sensor 1620 can utilize orientation sensing technology such as a magnetometer to detect the orientation of the communication device 1600 (north, south, west, and east, as well as combined orientations in degrees, minutes, or other suitable orientation metrics).

The communication device 1600 can use the transceiver 1602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1600.

Other components not shown in FIG. 16 can be used in one or more embodiments of the subject disclosure. For instance, the communication device 1600 can include a reset button (not shown). The reset button can be used to reset the controller 1606 of the communication device 1600. In yet another embodiment, the communication device 1600 can also include a factory default setting button positioned, for example, below a small hole in a housing assembly of the communication device 1600 to force the communication device 1600 to re-establish factory settings. In this embodiment, a user can use a protruding object such as a pen or paper clip tip to reach into the hole and depress the default setting button. The communication device 1600 can also include a slot for adding or removing an identity module such as a Subscriber Identity Module (SIM) card. SIM cards can be used for identifying subscriber services, executing programs, storing subscriber data, and so forth.

The communication device 1600 as described herein can operate with more or less of the circuit components shown in FIG. 16. These variant embodiments can be used in one or more embodiments of the subject disclosure.

The communication device 1600 can be adapted to perform the functions of computing devices that can perform methods 100-600 of FIGS. 1-6, the media devices 1408, or the portable communication devices 1416 of FIG. 4. It will be appreciated that the communication device 1600 can also represent other devices that can operate in communication systems 1400 of FIG. 14 such as a gaming console, an email application, an instant messaging application, a scheduling application, and a media player. In addition, the controller 1606 can be adapted in various embodiments to perform the functions 1462 and 1466, respectively.

Upon reviewing the aforementioned embodiments, it would be evident to an artisan with ordinary skill in the art that said embodiments can be modified, reduced, or enhanced without departing from the scope of the claims described below. For example, voice communications could also be analyzed to provide pop-up notifications to a user of how a conversational participant prefers to be addressed. These embodiments could also enable translation services to better enable users to understand finer details of new languages. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 17:
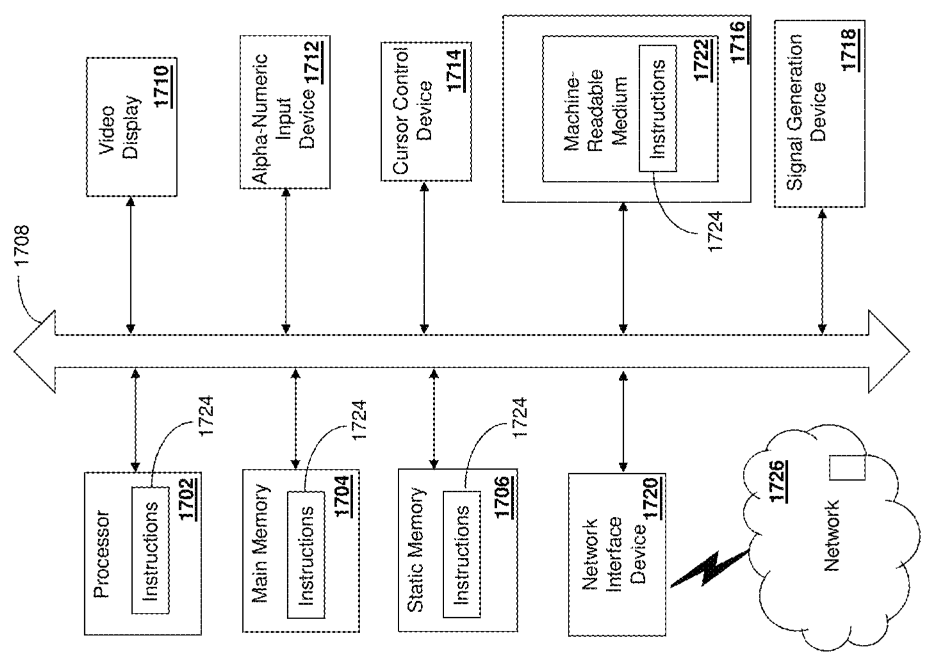
FIG. 17 is a diagrammatic representation of a machine in the form of a computer system within which a set of instructions, when executed, may cause the machine to perform any one or more of the methods described herein.

FIG. 17 depicts an exemplary diagrammatic representation of a machine in the form of a computer system 1700 within which a set of instructions, when executed, may cause the machine to perform any one or more of the methods described above. One or more instances of the machine can operate, for example, as the server 1430, devices performing software applications 1462 and 1466, and communications system 1400. Exemplarily, instances of the machine can perform communications operations to provide input to messaging in emails, text messages, and in other communications. In some embodiments, the machine may be connected (e.g., using a network 1726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1700 may include a processor (or controller) 1702 (e.g., a central processing unit (CPU)), a graphics processing unit (GPU, or both), a main memory 1704 and a static memory 1706, which communicate with each other via a bus 1708. The computer system 1700 may further include a display unit 1710 (e.g., a liquid crystal display (LCD), a flat panel, or a solid state display). The computer system 1700 may include an input device 1712 (e.g., a keyboard), a cursor control device 1714 (e.g., a mouse), a disk drive unit 1716, a signal generation device 1718 (e.g., a speaker or remote control) and a network interface device 1720. In distributed environments, the embodiments described in the subject disclosure can be adapted to utilize multiple display units 1710 controlled by two or more computer systems 1700. In this configuration, presentations described by the subject disclosure may in part be shown in a first of the display units 1710, while the remaining portion is presented in a second of the display units 1710.

The disk drive unit 1716 may include a tangible computer-readable storage medium 1722 on which is stored one or more sets of instructions (e.g., software 1724) embodying any one or more of the methods or functions described herein, including those methods illustrated above. The instructions 1724 may also reside, completely or at least partially, within the main memory 1704, the static memory 1706, and/or within the processor 1702 during execution thereof by the computer system 1700. The main memory 1704 and the processor 1702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving, by a processing system comprising a processor, a communication from equipment of a first user directed towards a second user;

analyzing, by the processing system, the communication from the equipment of the first user to determine a first communication style of the first user according to a first syntax value of the communication;

determining, by the processing system, a second communication style of the second user according to a second syntax value of a previous communication of the second user;

determining, by the processing system, whether the first communication style matches the second communication style;

responsive to the determining indicating that the first communication style matches the second communication style, providing, by the processing system, the communication to the equipment of the second user; and responsive to the determining indicating that the first communication style does not match the second communication style:

modifying, by the processing system, the communication from the first communication style to the second communication style to generate an example of the second communication style based on the second syntax value;

providing, by the processing system, a recommendation to the equipment of the first user to rewrite the communication according to the second communication style, wherein the providing the recommendation includes the example; and providing, by the processing system, a modified communication to equipment of the second user responsive to receiving an acceptance of the example from the equipment of the first user.

2. The method of claim 1, wherein the providing the recommendation comprises providing a sample of a preferred communication style of the second user.

3. The method of claim 2, wherein the modifying further comprises rewriting the communication into a format of the preferred communication style of the second user to match the second communication style.

4. The method of claim 1, further comprising:

determining if the second user is a new contact for the first user; and determining the second communication style of the second user responsive to a determination that the second user is a new contact.

5. The method of claim 1, further comprising providing a visual indicator at the equipment of the first user corresponding to the second communication style.

6. The method of claim 1, further comprising:

determining additional communication styles of additional recipients to which the communication is directed; and analyzing communication styles for the additional recipients to determine a group communication style, wherein the providing the recommendation includes the group communication style.

7. The method of claim 6, further comprising:

generating a group communication style icon; and providing the group communication style icon to equipment of each recipient of the communication and the equipment of the first user.

8. The method of claim 1, wherein the analyzing the first communication style comprises:

performing a syntax analysis on the communication from the equipment of the first user to determine a respective first word syntax value for each word of the communication from the equipment of the first user;

performing a sentence analysis on identified sentences of the communication from the equipment of the first user based on a second respective word syntax value of each word in each sentence to determine sentence values for each of the identified sentences; and generating a communication value for the communication from the equipment of the first user based on the sentence values.

9. A device, comprising:

a processing system including a processor; and a memory that stores executable instructions that, when executed by the processing system, facilitate performance of operations, comprising:

receiving a communication from equipment of a first user directed towards a second user;

analyzing the communication from the equipment of the first user to determine a first communication style of the first user according to a first syntax value of the communication;

determining a second communication style of the second user, wherein the second communication style is based on a second syntax value according to a previous communication of the second user;

responsive to a first determination that that the first communication style does match the second communication style, providing the communication to equipment of the second user; and responsive to a second determination that the first communication style does not match the second communication style:

modifying the communication from the first communication style to the second communication style to generate an example of the second communication style of the second user;

providing a recommendation to the equipment of the first user to rewrite the communication according to the second communication style, wherein the providing the recommendation includes the example; and providing, by the processing system, a modified communication to the equipment of the second user responsive to receiving an acceptance of the example from the equipment of the first user.

10. The device of claim 9, wherein the providing the recommendation further comprises providing a sample of a preferred communication style of the second user.

11. The device of claim 10, wherein the providing the recommendation further comprises rewriting the communication into a format of the preferred communication style of the second user to match the second communication style.

12. The device of claim 9, wherein the operations further comprise:

determining if the second user is a new contact for the first user; and determining the second communication style of the second user responsive to a determination that the second user is a new contact.

13. The device of claim 9, wherein the operations further comprise:

determining additional communication styles of additional recipients to which the communication is directed; and analyzing communication styles for the additional recipients to determine a group communication style, wherein the providing the recommendation includes the group communication style.

14. The device of claim 13, wherein the operations further comprise:

generating a group communication style icon; and providing the group communication style icon to equipment of each recipient of the communication and the equipment of the first user.

15. A non-transitory, machine-readable storage medium, comprising executable instructions that, when executed by a processing system including a processor, facilitate performance of operations, comprising:

receiving a communication from equipment of a first user directed towards a second user;

analyzing the communication from the equipment of the first user to determine a first communication style of the first user according to a first syntax value of the communication;

determining a second communication style of the second user according to a second syntax value of a communication from the second user;

responsive to a first determination that that the first communication style does match the second communication style, providing the communication to equipment of the second user; and responsive to a second determination that the first communication style does not match the second communication style, providing a recommendation to the equipment of the first user to rewrite the communication according to the second communication style, wherein the providing the recommendation comprises providing a rewritten example of the communication according to the second communication style of the second user based on the second syntax value, wherein the equipment of the first user provides a modified communication to the equipment of the second user according to the rewritten example.

16. The non-transitory, machine-readable storage medium of claim 15, wherein the operations further comprise providing a visual indicator at the equipment of the first user corresponding to the second communication style.

17. The non-transitory, machine-readable storage medium of claim 15, wherein the operations further comprise:

determining additional communication styles of additional recipients to which the communication is directed; and analyzing communication styles for the additional recipients to determine a group communication style, wherein the providing the recommendation includes the group communication style.

18. The non-transitory, machine-readable storage medium of claim 17, wherein the operations further comprise:

generating a group communication style icon; and providing the group communication style icon to equipment of each recipient of the communication and the equipment of the first user.

* * * * *